United States Patent Office 3,538,210
Patented Nov. 3, 1970

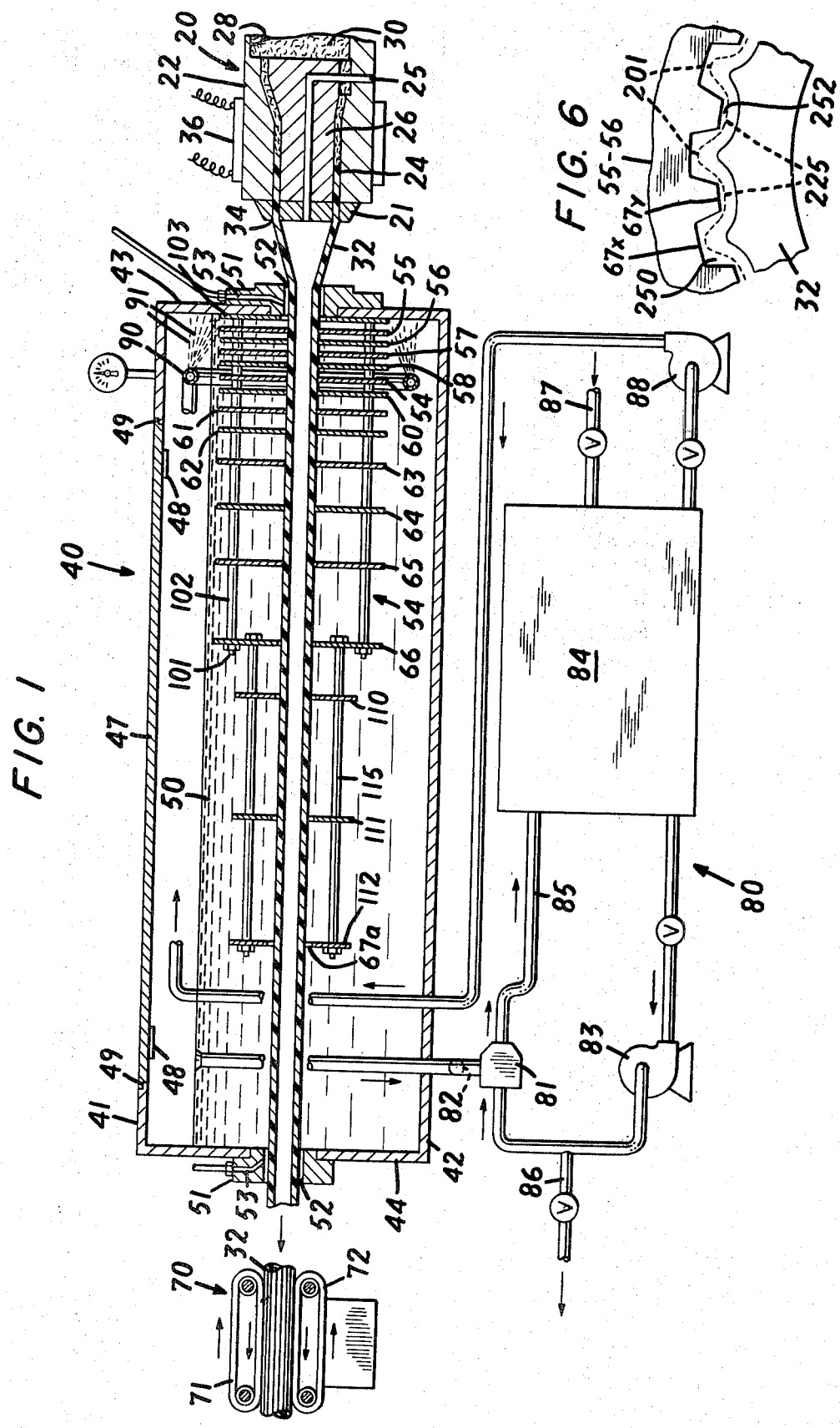

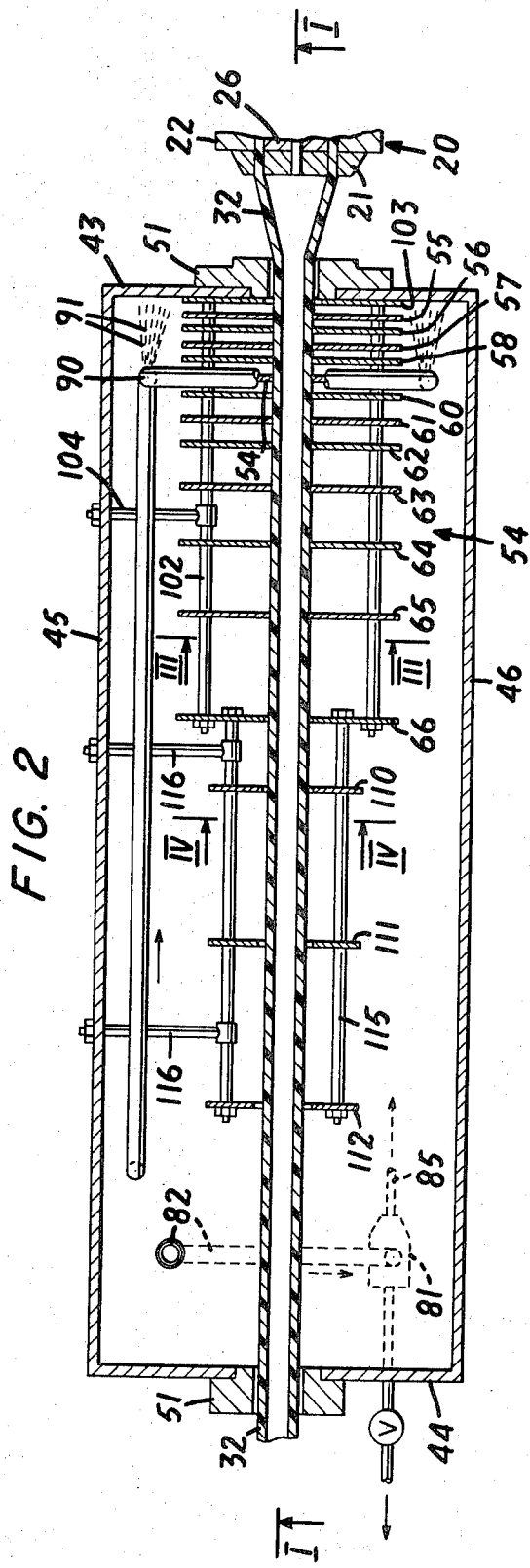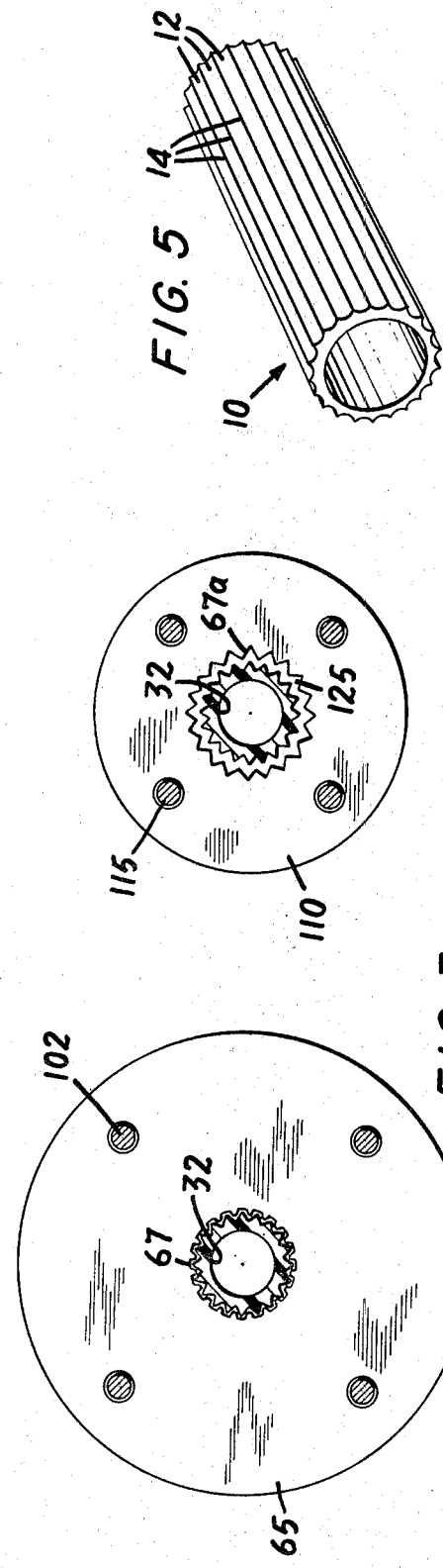

3,538,210
METHOD FOR FORMING PLASTIC TUBING
Charles Gatto, Farmingdale, N.Y., assignor to Philip Morris Incorporated, New York, N.Y., a corporation of Virginia
Filed July 24, 1968, Ser. No. 747,370
Int. Cl. B29c 17/00, 25/00
U.S. Cl. 264—90           7 Claims

ABSTRACT OF THE DISCLOSURE

A method with which externally fluted plastic tubing is extruded and sized to have a circumferential dimension within predetermined limits, the extrudate on leaving the forming die being advanced submerged through a cooling water bath of predetermined controlled temperature and confined in a cooling chamber maintained under evacuated condition of predetermined level, rapid heat transfer to the cooling water from the extrudates serving to set the exterior surface of the extrudate. The temperature range in which the cooling water bath is maintained is of critical consideration in effecting proper dimensioning of the extrudate. Precise sizing of the extrudate is accurately controlled by passing the extrudate through a sizing die assembly wherein there is applied a constraining force to the extrudate outside surface at a succession of spaced longitudinal locations along the course of the advance of the extrudate, the constraining force being used to prevent enlargement beyond predetermined limit of the circumferential dimension of the extrudate by a pressure differential of a higher pressure at the interior of the extrudate than in the cooling water bath. Concurrently with the latter, the extrudate surface cools sufficiently to set and impart permanent controlled dimensional character thereto. The die assembly consists of a series of apertured plates, the apertures in which are specially shaped in accordance with the final shape to be given to the extrudate external surface and which are of predetermined dimension so as to correspondingly control with exacting accuracy the final circumferential dimension of the extrudate.

BACKGROUND OF THE INVENTION

U.S. Pat. No. 3,169,272 describes a method and apparatus for forming plastic tubing which involves advancing a continuous length of tubing upon its exit from an extruder unit in a heated condition through a cooling chamber and in submerged contact with the water of a bath of water confined in the chamber at sub-atmospheric pressure so that atmospheric or static air inside the tubing will force the tubing against the surfaces of a sizing bushing in the cooling chamber thereby to give it its external shape and dimension. The set or hardening of the external surface of the tubing which gives the tubing its final shape and size thus is intended to occur within the sizing bushing as the passage of the tubing through the remainder of the cooling chamber is without constraint or support which could produce additional dimensional or shape alteration. The method and apparatus of this patent while adequate for producing plastic tubing for many purposes is not suitable for making plastic tubing which must be sized accurately to have a circumferential dimension not varying more than 0.4% from the prescribed dimension. A specific application involving such demanding accuracy of size is the use of plastic tubing as mouthpiece in filter components for cigarettes. Representative of such use is the cigarette described in pending patent application Ser. No. 632,336 filed Apr. 20, 1967, now Pat. No. 3,490,461, which discloses an improved ventilated cigarette embodying a plastic mouthpiece having a fluted external surface, the flutes and overlying cigarette tipping paper defining ventilation passages through which cooling and ventilating air is aspirated by the smoker concurrently with the intake of smoke during puffing. In cigarette making it is customary to join two filter components, for example, a filter plug of cellulose acetate and a plastic or paper tubular mouthpiece in a dual combining operation involving wrapping them in a combining paper wrap. This dual combining operation makes it essential that the two components have circumferential dimensions within predetermined ranges. If this requirement is not met it is possible that the automatic combining machinery will not function properly. For example, if one of the components is outsized, it may not process through the machinery smoothly and thus cause process upset requiring temporary stoppage of the machinery to clear the upset. Even if a dual combining operation would allow dissimilar or variable circumference sections to be combined, in subsequent cigarette assembly operations a tipping paper could not be properly adhered to both the cigarette and filter, also resulting in process upset. It has been found that with respect to a ventilated cigarette of the type described in the aforementioned patent application and having a tobacco cylinder with a circumference of 24.8 mm. there is a very specific circumference for the plastic tip which must be used in conjunction with a cellulose acetate section in the dual combining operation. The plastic rod circumference should have an optimum size of 23.9 mm. varying generally not more than ±0.1 mm. but preferably not more than ±0.05 mm. Thus, in the extrusion and sizing operations it is mandatory that unusually fine dimensioning control be maintained to insure that a rod having a circumference within the limits specified above is obtained to assure that when joined with a filter plug and wrapped together therewith by means of combining wrap, the total external dimension will be compatible with that of the tobacco cylinder thereby insuring avoidance of upset in the machinery with which the wrapped filter components are joined to the tobacco cylinder. Also it is important for the sake of appearance that the mouthpiece circumferential dimension not exceed stated limits since an outsize dimension can cause wrinkling in the tipping paper or improper overlap of same so as to prevent proper adhesion and securement of the tipping paper. Prior art methods and systems with which plastic tubing can be formed such as exemplified in the aforementioned U.S. patent cannot provide a finished plastic tubing sized with the accuracy described above. The mentioned U.S. patent, for example, describes sizing of the tubular rod as occurring in the sizing bushing alone. However, the sizing bushing is a metal element and is in full surface contact with the exterior of the themoplastic tubing during the initial time extrudate surface setting is occurring so that in spite of the teaching of the patent it is believed that insufficient heat transfer occurs between the tubing and the bushing to insure that the tubing outer surface circumferential dimension will properly set within the bushing. It is believed that instead, the tubing on exiting the bushings is amenable to further change in its circumferential dimension as it passes through the cooling chamber liquid which change while perhaps of no moment for most intended uses of tubing produced according to the patent, would render the tubing unsuitable for use in a cigarette as the mouthpiece component thereof where sizing criteria as given earlier must be strictly followed. It is also known in the art to use a series of spaced, apertured plates in lieu of single bushing of the mentioned patent as a sizing die assembly, as for example, in the manufacture of plastic drinking straws. However, in spite of improved shrinkage control and thus better dimensioning control possible when using the plate assembly it still is not possible to produce a tubing having circumferetial dimension within 0.4% of that intended. Moreover, nothing in the teaching of the aforementioned patent or similar known extruding procedures suggests that such procedues can be sucussfully applied to the extrusion and sizing of external surface configured plastic tubing.

SUMMARY OF THE INVENTION

The present invention is concerned with a method and apparatus for producing with constancy of manufacture, accurately and uniformly sized externally fluted plastic tubing which can be sectioned into lengths rendering it suitable for embodiment in a ventilated cigarette as a mouthpiece. In accordance with the invention, the tubing as it leaves an extruder unit in which it is formed is advanced through a cooling chamber containing a cooling bath of water which is maintained at a predetermined controlled temperature, the extrudate being in submerged contact with the water as it passes through the bath, the cooling of the extrudate being effected at a greater but predetermined rate at the tips of the flutes than at the grooves between the flutes. Thus the bath temperature must be accurately controlled within a predetermined range of temperature to properly size the tubing. Sizing of the extrudate to give it a final circumferential dimension within a predetermined range is effectively controlled by advancing it through a sizing die assembly located at the entry end of the cooling chamber, the sizing die assembly being comprised of a plurality of longitudinally spaced plates, each being provided with an aperture having a circumferential dimension of predetermined size, the plates being arranged with the respective apertures in alignment and the longitudinal spacing between succeeding plates being at least equal to the thickness of said succeeding plates. The latter is provided in order that the extrudate undergoes a travel which alternately subjects it to a sizing control when in contact with each plate followed by an exposure of its exterior surface to the heat transfer medium to progressively harden the set of the surface portion which was initiated upon first entry of the extrudate into the cooling chamber.

The invention accordingly comprises the features of consrtuction, combination of elements and arrangements or parts which will be exemplified in the construction hereinafter set forth and the scope of the invention will be indicated in the claims.

BRIEF DESCRIPTION OF THE DRAWINGS

A fuller understanding of the nature and objects of the invention will be had from the following detailed description taken in conjunction with the accompanying drawings in which:

FIG. 1 is a sectional view of apparatus with which extruded plastic tubing may be sized in accordance with the teaching of the present invention to have a circumferential dimension within predetermined limits, the view being as taken in the direction indicated by the line I—I of FIG. 2.

FIG. 2 is a plan view of the apparatus shown in FIG. 1, the top cover of the cooling chamber being removed and a number of the parts being shown in section.

FIGS. 3 and 4 are views as taken along the lines III—III and IV—IV respectively in FIG. 2.

FIG. 5 is a perspective view of a short length of the plastic extrudate which is sized in accordance with the present invention.

FIG. 6 is a fragmentary view illustrating the manner in which the heated extrudate controlledly shrinks in the course of its being sized.

Throughout the following description like reference numerals are used to denote like parts in the drawings.

DESCRIPTION OF THE PREFERRED EMBODIMENTS

The present invention is concerned with a method for forming plastic tubing in a continuous operation. It is more particularly concerned with a method with which externally fluted plastic tubing can be sized accurately to have a uniformity of circumferential dimension within prescribed predetermined limits the reasons why accuracy in controlling the circumferential dimension having been given more extensively earlier in the present specification. While the method of the present invention is described herein in representative form as used to form plastic rod suitable for incorporation in a ventilated cigarette as a mouthpiece, it should be understood that the broader aspects of the invention are applicable to the formation of any continuous rod-like article of a solid or hollow shape with either a cylindrical or polygonal section and wherein criticality of circumferential dimension is a prime consideration. The present invention also provides that the plastic rod subjected to the sizing procedure can be a protuberant external surface configuration of various description, the latter for example including the tubing of fluted configuration as shown in FIG. 5, the circumferential dimension thereof to be sized being that of a circle circumscribed about the peaks or tips of the respective flutes. Moreover, the quality of the surface finish of the tubing sized in accordance with the invention is characterized by being of substantially unmarred surface texture devoid of discoloration, surface irregularity, etc. As stated, FIG. 5 depicts a short length of plastic tubing intended for use as a ventilated cigarette mouthpiece 10. While the construction of a cigarette incorporating this form of mouthpiece is described in greater detail in the previously mentioned patent application, it is to be noted that said ventilated cigarette includes the usual tobacco cylinder, a filter plug aligned with the tobacco cylinder and a mouthpiece in alignment with the filter plug. As mentioned earlier, it is preferred that in making the cigarette, the mouthpiece and filter plug be joined as a unit with a porous combining wrap and thereafter joined as a unit to the tobacco cylinder with tipping paper. The combining wrap and flutes of the mouthpiece define air channels through which air is aspirated by the smoker in puffing the cigarette, entry to the channels being by means of perforations in the tipping paper at the front end of the mouthpiece, which exit from the channels being directly into the smoker's mouth. The plastic mouthpiece 10 has a generally cylindrical shape with the external surface configuration thereof being in the form of longitudinally directed concave grooves 12 with flutes 14 being formed by the intersection of adjacent grooves. The tip ends of the flutes 14 while depicted in the drawings as being sharply pointed, can be and preferably are slightly rounded surfaces having a radius of substantially .005". The grooves 12 may vary as to total number and size in accordance with the ventilation characteristics of the cigarette. In the ensuing description, the plastic tubing from which the mouthpieces 10 are made will be described by way of example as having 24 to 30 flutes and a preferred circumferential dimension (of a circle circumscribing the flutes) of 23.9 mm.±0.1 mm. but preferably 23.9 mm.±0.05 mm. As used herein circumferential dimension is intended to denote the dimension of an imaginary continuous line encircling the tips of the protuberant flutes or like projections and in contact therewith. The wall thickness of the mouthpiece as measured from the tip end of the respective flutes to the inside diameter of the mouthpiece preferably lies in the range .026"–.030" with the groove depth being in the range .009"–.012".

Plastics suitable for manufacture include normally solid polyolefins, styrenes, acetates and similar materials. Low density polyethylene is preferred for making the mouthpieces 10 and the parameters given herein, especially cooling bath temperatures, are those applicable for processing low density polyethylene.

Turning now to a consideration of the apparatus shown in FIGS. 1 and 2, it includes as major components, an extruder unit 20, a cooling chamber 40 wherein the tubing is sized, a tube pulling unit 70 and a vacuum inducer-coolant system 80. The extruder unit 20 is of conventional construction and includes an extruder body 22 in which is formed a central cavity 24 for supportingly receiving mandrel 26, the latter being located forward of a reservoir 28 which is filled with a molten plastic 30, and being spaced from the cavity within the body 22 such as to provide that a continuous cylindrically shaped tubular extrudate 32 issues from the mouth of the extruder at a rate determined by the speed at which the extruder screw (not shown) rotates, the extrudate 32 on leaving the extruder generally having an outer diameter as at 34 of about twice the diameter of the finished product and being fluted. It will be understood that the extruder body 22 can be provided with a suitably internally configured adapter piece 21 to produce the desired surface shape on the extrudate. Thus for fluted rod as shown in FIG. 5 and for reasons as will appear, the adapter piece 21 is provided with somewhat square tooth-like projections corresponding in number to the number of flutes 14. The flute tip shape of the extrudate which issues from the adapter piece 21 does not follow the exact configuration of the square tooth shape of the latter but will have a more generally pointed tip shape. The extruder body 22 is preferably encased with a heater unit 36 to maintain the plastic in reservoir 28 at the requisite molten condition to provide that polyethylene extrudate will issue from the adapter unit at a temperature in a range of about 350° F.–390° F. For reasons as will appear later, the present invention provides that a pressure differential of greater pressure acting on the inside of the extrudate 32 and tending to enlarge it as it passes through the cooling chamber 40 is utilized as an essential force in sizing the extrudate to provide it with a circumferential dimension within the range prescribed. As was mentioned, the extrudate 32 on leaving the extruder unit 20 is drawn or pulled down from the larger diameter it has at 34 to a diameter substantially equal to that of the finished product as soon as it makes first entry to the cooling chamber 40, said first entry being accompanied by an immediate initiation of the setting or hardening of the outer surface thereof.

Cooling chamber 40 as will be noted is comprised of an elongated structure having parallel top and bottom walls 41, 42 as well as opposed end walls 43 and 44 and side walls 45 and 46, the top wall including a door 47 hinged thereto as at 48 and capable of being closed in airtight connection therewith against suitable gasket means shown generally at 49. The chamber 40 constitutes an enclosure wherein may be confined a bath of cooling fluid 50, preferably water, with the chamber having entry and exit apertures at opposite ends thereof wherein are supported gland discs 51, each of which is centrally apertured as at 52 and has an internal radially directed passage 53 through which a flow of water may be communicated to the aperture 52. In this manner a seal of substantially airtight character can be provided at the entry and exit ends of the chamber, the water entering the gland through passage 53 functioning to prevent the incursion of air to the interior of the chamber which as will be described is maintained under an evacuated condition and also to lubricate the extrudate surface. Sizing of the extrudate 32 during the course of its passage through the chamber is effected by means of a sizing assembly denoted generally at 54 and comprised of a plurality of longitudinally spaced sizing plates or discs 55–66, each of which has a central aperture 67 therein, the central apertures of the respective discs being arranged in axial alignment with each other and with the extruder adapter piece 21. For reasons as will be made apparent shortly, the first grouping of sizing plates 55–60 are arranged at regular spaced intervals whereas the succeeding plates 61–66 have a spacing interval of increasing length, more specifically a spacing of geometric progression. The assembly 54 of sizing plates can be secured together in various means, in one form, the plates being connected together with an elongated threaded rod 101, the rod being enclosed between succeeding plates by means of spacer sleeves 102 with the entire assembly being joined to an anchor plate 103 secured in known manner to end wall 43. The rod-spacer sleeve arrangement may be utilized at a plurality of locations as shown in FIGS. 3 and 4 to provide sufficient rigidity to the assembly to preclude any advent of misalignment between the apertures of the respective plates. Lateral support for the assembly also may be provided as shown in FIG. 2 by means of a side brace 104. A sub-assembly of plates 110–112 also extends downstream from the sizing assembly, these plates 110–112 being provided to constitute tubing support means along with the last sizing plate 66 in assembly 54 and which each function to establish a water supporting annulus for supporting the extrudate in the course of its longitudinal advance during the terminal stages of the cooling thereof as distinguished from actual sizing of the extrudate by constrainedly engaging same as is the function of plates 55–65. The sub-assembly of the plates 110–112 also may be connected together in the same manner as the sizing assembly 54 having intervening spacer sleeves 115 as well as lateral support members 116. The central aperture 67 in each of the plates 55–66 is the same size and shape for all of the plates, that is, the aperture is of generally square toothed configuration as shown in FIG. 6 which configuration is used in conjunction with sizing of the generally pointed fluted extrudate issuing from the adapter piece 21. This particular plate aperture configuration is required to enable effecting cooling at a greater rate of the flute tip ends than at the grooves between the flutes. Furthermore, the apertures of all plates are of a predetermined size designed to give the optimum intended final circumferential dimension to the extrudate, i.e., 23.9 mm. The nominal aperture dimensions of the plates 55–66 for sizing extrudate with the dimension just mentioned and taking into account the fact that the extrudate in cooling will shrink, are a major diameter along the flats 67x of substantially .331" and a minor diameter along the flats 67y of substantially .303".

At the early stages of cooling, that is, the initial course of travel of the extrudate through the cooling chamber, it is essential that the extrudate be alternately sized and exposed to cooling medium along substantially equal lengths of its course or travel. Hence, the longitudinal spacing between each of the successive sizing plates 55–60 in the first grouping of sizing plates is substantially equal and moreover the spacing between the succeeding plates is at least equal but preferably slightly in excess of the travel of the extrudate 32 under constraint in passing through succeeding ones of said plates. In order to size the extrudate 32 properly it is necessary that the external surface harden sufficiently and in controlled manner to hold the intended external dimension. This of necessity requires rapid and extensive transfer of heat from the thermoplastic material of the extrudate to the cooling medium 50 in the cooling chamber. Thus, there is required that the travel of the extrudate through chamber 40, which occurs at speeds in a range of 160–200 feet per minute, include an alternate pattern of exposure to the cooling medium and constraint of the extrudate to produce in it the prescribed circumferential dimension in correspondence to the setting of the surface portion. As the advance of the extrudate progresses, the degree of setting of the extrudate surface is concurrently and controlledly increased and hence the second grouping of plates 61–66 can be arranged with the greater longitudinal spacing indicated in FIGS. 1 and 2. By the time the extrudate in the course of its advance arrives at the end of the sizing die assembly, the surface portion generally has achieved sufficient hardness to make the further use of sizing rings unnecessary. In other words, an external circumferential dimension within the prescribed range of 23.9 mm.±.05 mm. has been achieved. However it is preferable that in the continued passage of the extrudate through the cooling chamber it have some measure of support as further cooling of the extrudate material progresses. Thus there is employed plates 66, 110–112 which are provided with apertures 67a of somewhat greater size than the apertures in the plates 55–65, the somewhat larger apertures 67a serving to entrap an annulus 125 of water between the aperture and the extrudate which water annulus serves as a support means to prevent any flexure in the advancing extrudate which if occurring at this late stage in the cooling operation would be of permanent character and impossible to remove by further processing of the extrudate without rendering it unsatisfactory for its intended purpose.

The function of sizing the extrudate 32 is in part achieved by utilizing a pressure differential which tends to radially expand the extrudate outwardly to thereby enlarge its circumferential dimension, while simultaneously constraining the external surface of the extrudate along a succession or series of longitudinal locations in the course of its advance in accompaniment with exposure to the cooling medium to set the extrudate surface. The establishment of this differential of pressure is achieved by admitting static or atmospheric air interiorly of the extrudate through a vent passage 25 extending through mandrel 26 and the body 22 of the extruder unit in the manner as best seen in FIG. 1, and by maintaining the interior of the cooling chamber 40 under an evacuated condition in the manner now to be described. The vacuum-coolant system denoted generally at 80 in FIG. 1 maintains, as applicable to sizing a polyethylene extrudate, a condition of vacuum of at least 20 inches of water within the chamber 40 and it supplies cool water to the chamber for removing heat from the extrudate and it also re-circulates heated water from the chamber to a heat exchanger (not shown). For extrudates made from materials previously mentioned herein and in order to achieve circumferential dimension in the range prescribed while operating in a production speed range of at least 160–200 f.p.m., the bath temperature must be maintained in the temperature range 75° F. to 85° F. but preferably 75° F. to 80° F. It should be understood that the establishment and maintenance of proper cooling bath temperature in accordance with the present invention is essential to producing properly sized rod. Thus the cooling bath is maintained at a particular temperature not merely to provide for heat transfer from the heated extrudate but to present a specific cooling sink level associated with effecting proper dimensioning of the rod. Thus the extrudate sizing must be achieved in a bath of predetermined controlled temperature which temperature must also be maintained in the sizing plates 55–67. If the extrudate was sized in a bath maintained at less than 75° F., the set of the surface of the extrudate would occur at a rate too quickly to allow for accurate dimensioning within the heretofore mentioned tolerance of 0.4%. Similarly, sizing in a bath at a temperature greater than 85° F. is difficult particularly with respect to accuracy of dimensioning possible therein.

In sizing the mouthpiece rod shown in FIG. 5, the sizing in effect is achieved with a controlled differential shrinking of the flutes 14 and grooves 12. The flutes 14 shrink and set first followed by a pulling away or shrinking of the grooves 12. Further understanding of the latter will be had by reference to FIG. 6 which shows the manner in which the fluted surface of the extrudate 32 shrinks in being cooled within the cooling chamber. The extrudate leaves the adapter piece 21 of extruder body 22 with protuberant surface projections 201 formed thereon in the pattern as shown in dashed lines in FIG. 6. In the course of the passage of the extrudate through the cooling chamber and through the sizing plates 55–66 and most particularly in the region of first entry into the cooling bath, to cooling at a greater but predetermined rate at the tips 201 of the flutes than at the grooves 225 between said flutes. This necessary and deliberately produced differential of cooling rate between the tips of the flutes and the grooves must be achieved to properly set the extrudate surface and thereby accurately control its dimensioning. The foregoing will be further understood in considering that normally the extrudate shell at the grooves would set first because of its lesser thickness which more readily yields heat than the shell at the flutes which has a greater wall thickness. But since setting of the tips of the flutes for dimensioning control is more important than setting at the grooves, cooling of the latter is retarded or deliberately lessened with respect to that at which the flute tips are cooled. For that purpose and as shown in FIG. 6, greater space is provided in the sizing plate aperture teeth confronting the tips of the flutes as at 250 than is provided in the space 252 confronting the grooves. Approximately 50% of the total shrinkage of the flutes occurs immediately upon entry of the heated extrudate into the cooling chamber 40.

As seen in FIG. 1, the devices of the vacuum-coolant system include an aspirator 81 having an intake line 82 extending upwardly into the cooling chamber to the surface level of the liquid in the chamber. The venturi of the aspirator is supplied with a jetting flow by means of pump 83 taking suction from a water sump 84. Discharge from the aspirator 81 which includes water and air aspirated from the cooling chamber is returned to the sump by means of pipe 85. The discharge from the pump 83 also includes a branch as at 86 which leads to a suitable heat exchanger (not shown), the return flow of cool water from the heat exchanger to the sump by means of inlet pipe 87. The cooling system also includes a second pump 88 which returns the supply of cool water to the chamber 40, the discharge being from a cooling ring 90 supported in the cooling chamber adjacent end wall 43. The cooling ring is an annular pipe provided with a circle of ports designed to provide issuance laterally therefrom of a cooling spray 91 from the ring against the adjacent inner side of end wall 10. The cooling ring is positioned in the chamber in this manner to produce turbulence within the cooling medium at the entry end of the bath to provide positive water circulation in this region for stabilizing the bath temperature in the predetermined controlled range of 75° F.–85° F. at the entry end.

On leaving the cooling chamber 40, the extrudate 32 passes between the rotating belts 71, 72 of suitable puller device 70 which feeds the extrudate through a cutting unit (not shown) wherein the continuous length extrudate is cut into sections of length more suited for further processing in cigarette making machinery.

The extrudate 32 is shown in FIG. 1 as entering the puller device 70 shortly upon exit from cooling chamber 40. However, it is also possible to employ additional cooling chambers for accurately and progressively cooling the extrudate, this being done subsequent to completion of the sizing of the extrudate external surface. Thus for example, polyethylene extrudate issuing from cooling chamber 40 may first transit a second cooling chamber (not shown) wherein the bath temperature is maintained at substantially 65° F. and under a vacuum of 20 inches of water before entering the puller device. However, it will be understood that setting of the surface of the extrudate and hence accurate sizing of same takes place within the chamber 40.

The achievement of accurate dimensioning of the extrudate within the prescribed range of ±0.4% of the intended circumferential dimension is effected by precisely controlling various system parameters as well as employment of certain essential processing techniques. More particularly, the following conditions and procedures must be observed:

(1) The temperature of the heated extrudate exiting the adapter piece 21 should be maintained at the requisite level.

(2) Sizing of the heated extrudate should be initiated in a cooling bath of exact predetermined controlled temperature which for low density polyethylene should be 75° F.–85° F.

(3) The cooling bath should be maintained under a condition of vacuum of prescribed level.

(4) External constraint should be applied to the extrudate at a series of spaced locations along the course of the extrudate travel in the cooling bath.

(5) Positive circulation of liquid in the cooling bath at the entry end thereof should be provided to insure an accurate constant sink temperature at this location of the cooling bath since 50% of the surface set occurs immediately upon the entry of the extrudate therein.

(6) Cooling of the extrudate should be at a greater but predetermined rate at the tips of the flutes than at he grooves between the flutes.

It will thus be seen that the objects set forth above among those made apparent from the foregoing description, are efficiently attained and, since certain changes in carrying out the above method may be made without departing from its scope, it is intended that all matter contained in the above description shall be interpreted as illustrative and not in a limiting sense.

What is claimed is:

1. A method for forming thermoplastic tubing having an externally fluted surface comprised of an arrangement of circularly spaced tipped flutes intervened by grooves characterized by the tubing having essentially uniform circumferential dimension in a course circumscribing the tips of said flutes and varying not more than a predetermined percentage from an optimum intended dimension, said method including:

extruding an externally fluted workpiece of thermoplastic material as an extrudate heated to a temperature at which it can be plastically deformed, cooling the extrudate at a greater but predetermined rate at the tips of the flutes than at the grooves between said flutes while advancing the extrudate submerged through a bath of liquid coolant and in contact with the latter thereby to effect a more rapid rate of setting in the surface of the flutes then in the surface of said grooves, establishing a differential of pressure between the interior of said extrudate and said liquid coolant and tending to expand said extrudate radially, said cooling being effected at least in part, while applying constraining force to the outside surface of said extrudate during its passage through said bath to prevent enlargement thereof beyond predetermined limit as the extrudate surface setting progresses, said constraining force being applied at a succession of spaced longitudinal locations along the course of advance of the extrudate, and maintaining said bath of liquid coolant at least in the region where said extrudate makes first entry thereto at a predetermined controlled temperature effecting heat transfer from said extrudate at controlled rate and sufficient to cause a controlled shrinkage in said extrudate to occur upon first entry of said extrudate into said bath.

2. The method of claim 1 wherein said plastic tubing is extruded polyethylene, and the bath of liquid coolant is maintained at a temperature in a range between 75° F.–85° F.

3. The method of claim 2 wherein the bath of liquid coolant is maintained at a temperature in a range between 75° F.–80° F.

4. The method of claim 2 wherein the differential of pressure between the interior of said extrudate and said liquid coolant is establish by communicating the interior of said extrudate with atmosphere, and confining the bath of liquid coolant under a condition of vacuum of at least 20 inches of water.

5. The method of claim 2 wherein the constraining force applied to said extrudate is applied at a first grouping of spaced longitudinal locations substantially equally spaced one from another, and at a second grouping of locations spaced from one another at progressively increasing distances in correspondence to the advance of the extrudate.

6. The method of claim 5 wherein the distances between locations in said second grouping increase in a geometric progression.

7. The method of claim 5 further comprising supporting said extrudate downstream of said second grouping of locations at a plurality of longitudinally spaced locations on an annulus of liquid formed in said bath.

References Cited

UNITED STATES PATENTS

| | | | |
|---|---|---|---|
| 2,423,260 | 7/1947 | Slaughter | 264—209 X |
| 2,551,710 | 5/1951 | Slaughter. | |
| 3,129,461 | 4/1964 | Zavasnik, et al. | 264—209 X |
| 3,169,272 | 2/1965 | Maxson | 264—209 X |
| 3,182,108 | 5/1965 | Branscum | 264—209 |
| 3,184,791 | 5/1965 | Gamble et al. | |

OTHER REFERENCES

Doherty and Cotter: "External Vacuum Sizing of Thermoplastic Pipe and Tubing," SPE Journal, October 1964, pp. 1093–1097.

ROBERT F. WHITE, Primary Examiner

J. H. SILBAUGH, Assistant Examiner

U.S. Cl. X.R.

18—14; 264—209, 237